(12) United States Patent
Ozeki

(10) Patent No.: US 12,554,734 B2
(45) Date of Patent: Feb. 17, 2026

(54) INFORMATION PROCESSING APPARATUS, INFORMATION PROCESSING METHOD, AND PROGRAM

(71) Applicant: FUJIFILM Corporation, Tokyo (JP)

(72) Inventor: Makoto Ozeki, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/909,916

(22) Filed: Oct. 8, 2024

(65) Prior Publication Data

US 2025/0028728 A1 Jan. 23, 2025

Related U.S. Application Data

(63) Continuation of application No. PCT/JP2023/011775, filed on Mar. 24, 2023.

(30) Foreign Application Priority Data

Apr. 18, 2022 (JP) .................. 2022-068505

(51) Int. Cl.
*G06F 16/248* (2019.01)
(52) U.S. Cl.
CPC ................... *G06F 16/248* (2019.01)
(58) Field of Classification Search
CPC ................ G06F 16/248; G06F 16/53
See application file for complete search history.

(56) References Cited

U.S. PATENT DOCUMENTS

| | | | |
|---|---|---|---|
| 9,477,726 B2 * | 10/2016 | De Bellis | G06F 16/24575 |
| 10,275,869 B2 | 4/2019 | Yamagishi et al. | |
| 10,942,130 B2 * | 3/2021 | Karube | G01N 21/8851 |
| 11,354,814 B2 * | 6/2022 | Kong | G06V 20/10 |
| 11,954,844 B2 * | 4/2024 | Kong | G06T 7/001 |
| 2007/0005571 A1 | 1/2007 | Brewer et al. | |
| 2010/0076975 A1 * | 3/2010 | Futatsugi | G06F 16/9038 707/E17.014 |

(Continued)

FOREIGN PATENT DOCUMENTS

| | | |
|---|---|---|
| JP | 2004118613 | 4/2004 |
| JP | 2005275979 | 10/2005 |

(Continued)

OTHER PUBLICATIONS

"International Search Report (Form PCT/ISA/210) of PCT/JP2023/011775", mailed on Apr. 25, 2023, with English translation thereof, pp. 1-5.

(Continued)

*Primary Examiner* — Jorge A Casanova
(74) *Attorney, Agent, or Firm* — JCIPRNET

(57) ABSTRACT

Provided are an information processing apparatus, an information processing method, and a program with which it is possible to easily make determination from a search result and to ascertain a point to which attention should be paid in the search result by organizing display contents according to search contents and the search result. In an information processing apparatus (10) including a processor, the processor is configured to: acquire a search query; acquire a search result of search performed based on the search query on a database; acquire meta-information of the search query; and decide display contents based on the meta-information.

12 Claims, 12 Drawing Sheets

(56) References Cited

U.S. PATENT DOCUMENTS

| | | | | |
|---|---|---|---|---|
| 2012/0170854 | A1* | 7/2012 | Jain | G06F 16/50 |
| | | | | 382/209 |
| 2016/0292518 | A1* | 10/2016 | Banitt | G06V 20/56 |
| 2017/0097967 | A1* | 4/2017 | Savliwala | G06F 16/951 |
| 2018/0182090 | A1* | 6/2018 | Yamagishi | G06T 7/001 |
| 2019/0286893 | A1 | 9/2019 | Adachi | |

FOREIGN PATENT DOCUMENTS

| | | |
|---|---|---|
| JP | 2009500719 | 1/2009 |
| JP | 2019160001 | 9/2019 |
| WO | 2017056804 | 4/2017 |

OTHER PUBLICATIONS

"International Preliminary Report On Patentability (Form PCT/IPEA/409) of PCT/JP2023/011775", completed on Jun. 25, 2024, with English translation thereof, pp. 1-7.

* cited by examiner

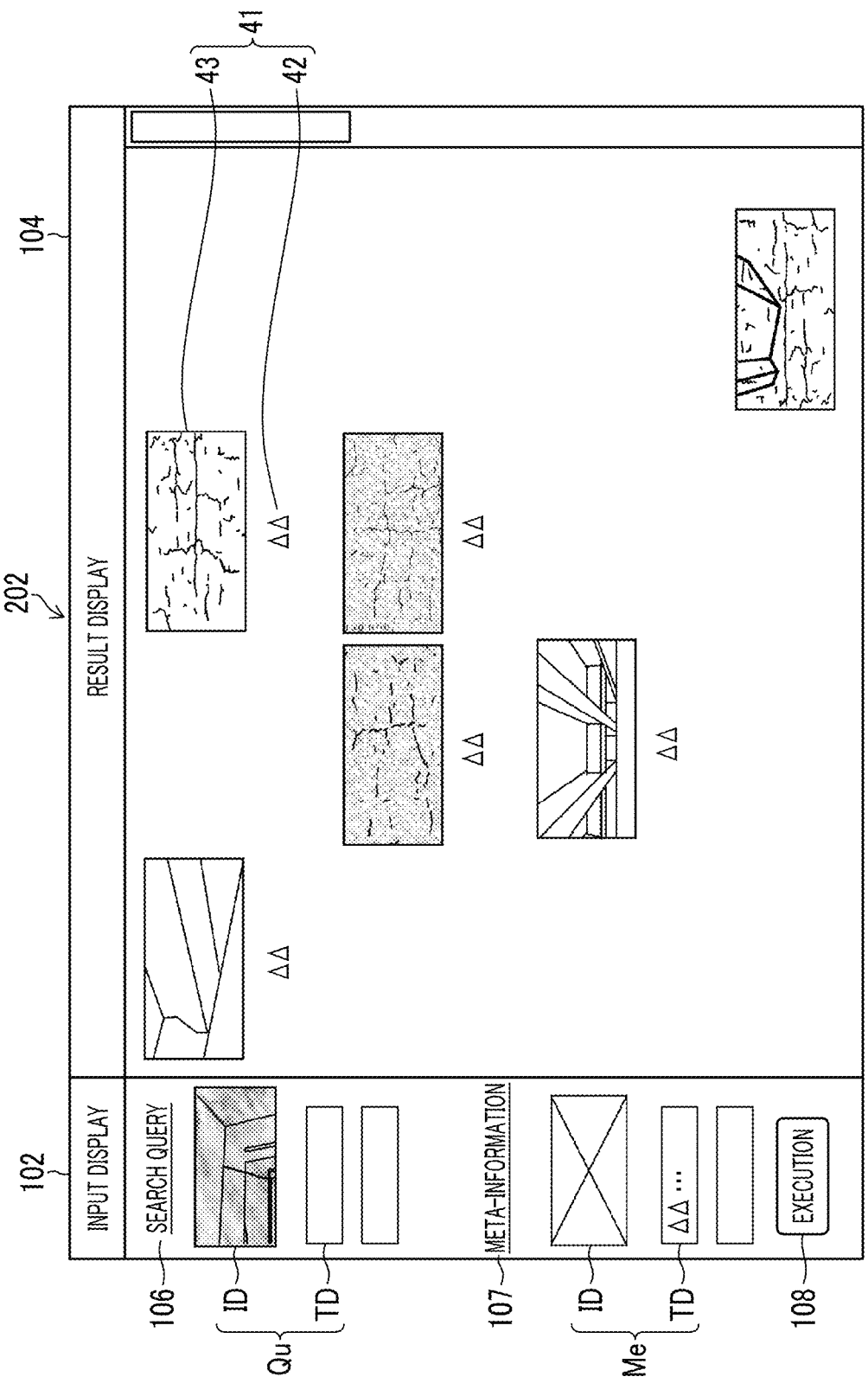

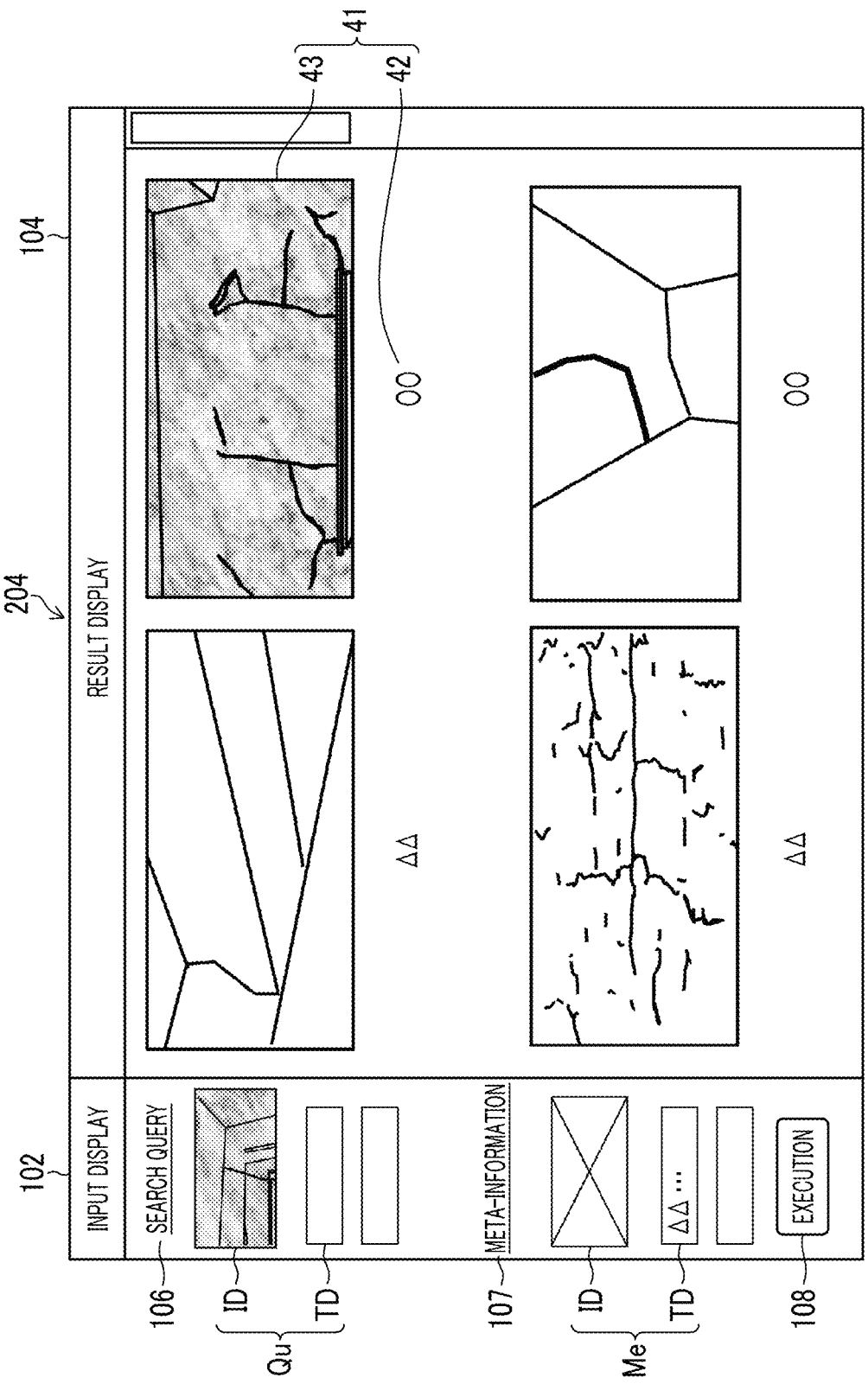

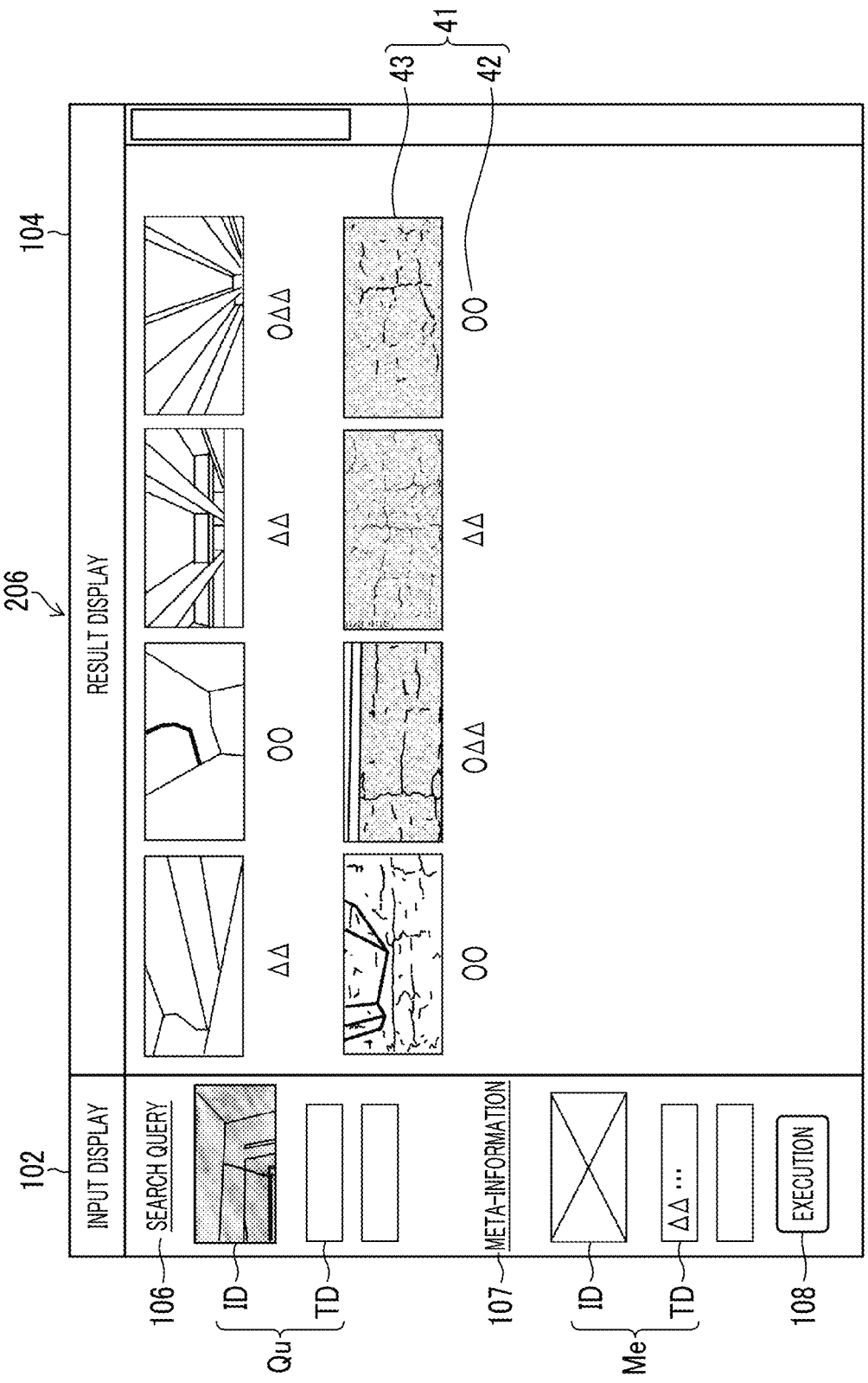

INFORMATION PROCESSING APPARATUS, INFORMATION PROCESSING METHOD, AND PROGRAM

CROSS-REFERENCE TO RELATED APPLICATIONS

The present application is a Continuation of PCT International Application No. PCT/JP2023/011775 filed on Mar. 24, 2023 claiming priority under 35 U.S.C § 119(a) to Japanese Patent Application No. 2022-068505 filed on Apr. 18, 2022. Each of the above applications is hereby expressly incorporated by reference, in its entirety, into the present application.

BACKGROUND OF THE INVENTION

1. Field of the Invention

The present disclosure relates to an information processing apparatus, an information processing method, and a program.

2. Description of the Related Art

In the related art, a facility manager requests a construction consultant to perform tasks such as inspections, and an inspector with specialized knowledge conducts inspections of various structures (also referred to as architectural structures, constructions, constructed structures, or infrastructure) such as bridges, roads, tunnels, dams, and buildings.

In WO2017/056804A, a first inspection result is acquired, a second inspection result is searched for from a database based on an image feature included in the first inspection result, a specific inspection result corresponding to a construction condition is searched for from the searched second inspection result, and the specific inspection result is preferentially displayed on a display unit.

SUMMARY OF THE INVENTION

Meanwhile, in recent years, there has been an increasing demand for inspections by non-experts due to rising costs and a shortage of labor. However, it is not easy for a non-expert to make determination from a search result displayed by executing a search query, and it is not easy to ascertain a point to which attention should be paid in the search result.

The present invention has been made in view of such circumstances, and an object of the present invention is to provide an information processing apparatus, an information processing method, and a program with which it is possible to easily make determination from a search result and to ascertain a point to which attention should be paid in the search result by organizing display contents according to search contents and the search result.

According to a first aspect, there is provided an information processing apparatus comprising a processor, in which the processor is configured to: acquire a search query; acquire a search result of search performed based on the search query on a database; acquire meta-information of the search query; and decide display contents based on the meta-information.

In the information processing apparatus according to a second aspect, the processor is configured to decide the display contents based on the search result.

In the information processing apparatus according to a third aspect, the processor is configured to output the display contents.

In the information processing apparatus according to a fourth aspect, the processor is configured to decide a priority of the display contents.

In the information processing apparatus according to a fifth aspect, the processor is configured to decide adoption or rejection of a candidate for the display contents.

In the information processing apparatus according to a sixth aspect, the processor is configured to decide the display contents to be hidden and other display contents to be displayed.

In the information processing apparatus according to a seventh aspect, the meta-information includes information about a structure.

In the information processing apparatus according to an eighth aspect, the information about the structure in the meta-information includes at least one selected from the group of a damage image, specifications, damage information, repair information, peripheral information, weather information, and statistical information.

In the information processing apparatus according to a ninth aspect, the search query includes information about a structure.

In the information processing apparatus according to a tenth aspect, the information about the structure in the search query includes at least one selected from the group of a damage image, specifications, damage information, repair information, peripheral information, weather information, and statistical information.

According to an eleventh aspect, there is provided an information processing method executed by a processor, the method comprising: acquiring a search query; acquiring a search result of search performed based on the search query on a database; acquiring meta-information of the search query; and deciding display contents based on the meta-information.

According to a twelfth aspect, there is provided a program executed by a processor, the program causing the processor to execute: acquiring a search query; acquiring a search result of search performed based on the search query on a database; acquiring meta-information of the search query; and deciding display contents based on the meta-information.

According to the present invention, it is possible to easily make determination from a search result, and to ascertain a point to which attention should be paid in the search result by organizing display contents according to search contents and the search result.

BRIEF DESCRIPTION OF THE DRAWINGS

FIG. 10 is a diagram for describing an example of a display screen where adoption or rejection of a candidate is decided.

FIG. 11 is a diagram for describing an example of an enlarged display screen.

FIG. 12 is a diagram for describing an example of a sorted display screen.

DESCRIPTION OF THE PREFERRED EMBODIMENTS

Hereinafter, preferred embodiments of an information processing apparatus, an information processing method, and a program according to the present invention will be described with reference to the accompanying drawings. In the present specification, the term "structure" includes a construction, for example, a civil engineering structure such as a bridge, a tunnel, and a dam, and also includes an architectural structure such as a building, a house, or a wall, a pillar, or a beam of a building.

Figure 1:
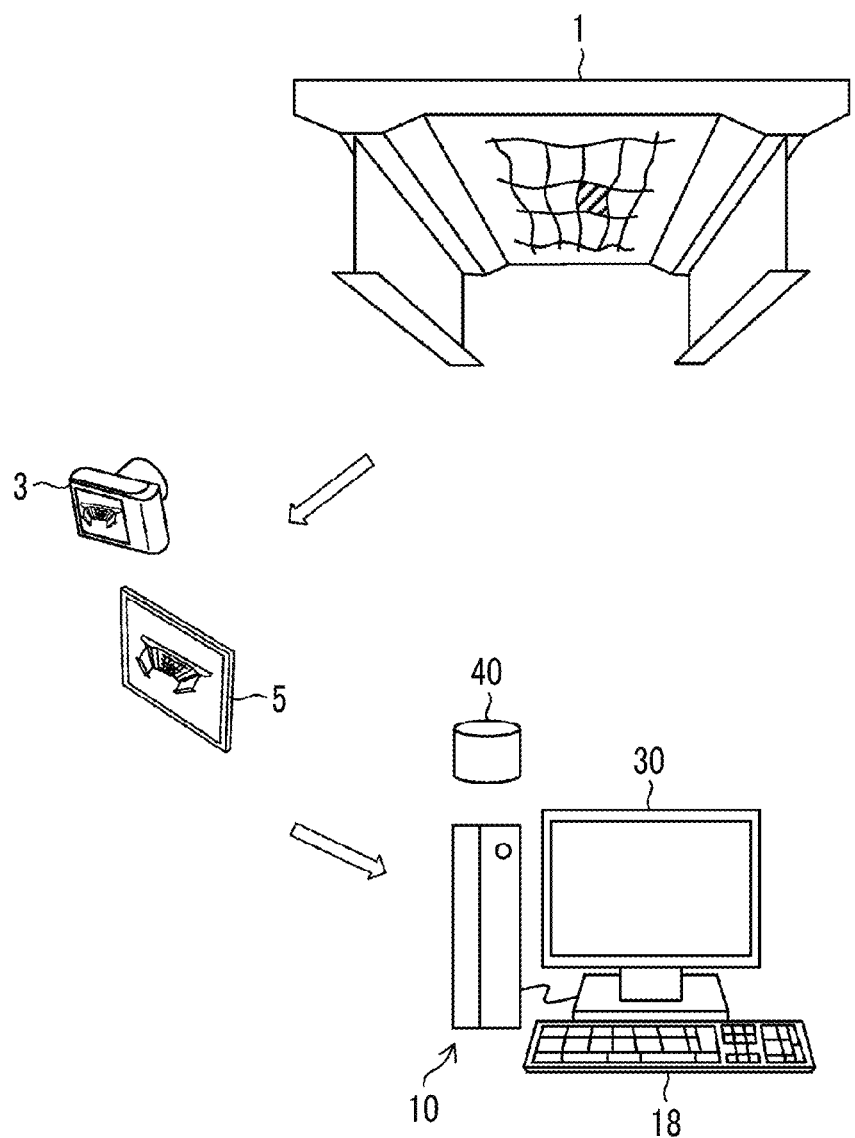
FIG. 1 is a schematic diagram of an information processing apparatus.

FIG. 1 is a schematic diagram of an information processing apparatus 10. The information processing apparatus 10 is connected to an operation unit 18 and a display device 30. As shown in FIG. 1, a user obtains an inspection result of a structure 1 via a camera 3 or a mobile terminal 5.

Various mobile terminals having imaging and information input functions, such as smartphones, tablet terminals, and portable personal computers, are suitably used as the mobile terminal 5.

The user inputs a search query based on an inspection result into the information processing apparatus 10 via the operation unit 18. The information processing apparatus 10 acquires the input search query. The information processing apparatus 10 acquires a search result of search performed based on the search query on a database 40. The database 40 includes, for example, past inspection results related to the structure.

The information processing apparatus 10 acquires meta-information of the search query and decides display contents based on the meta-information. Further, the information processing apparatus 10 displays the decided display contents on the display device 30.

Since the information processing apparatus 10 organizes the display contents according to the search result and search contents thereof, the user can easily make determination from the search result and ascertain a point to which attention should be paid in the search result.

Hereinafter, the present embodiment will be described in detail.

[Hardware Configuration of Information Processing Apparatus]

Figure 2:
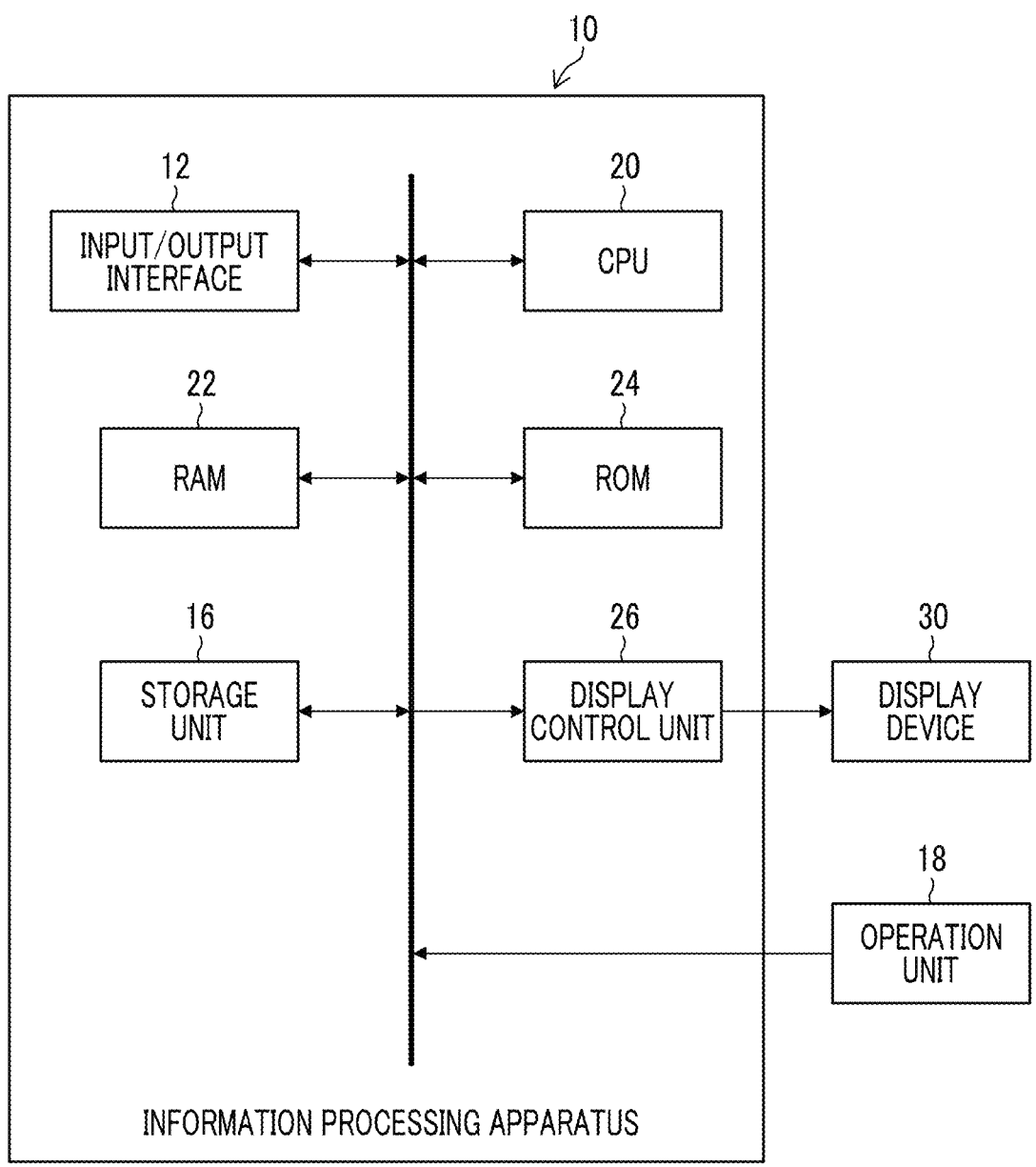
FIG. 2 is a block diagram showing an example of a hardware configuration of the information processing apparatus.

FIG. 2 is a block diagram showing an example of a hardware configuration of the information processing apparatus according to the embodiment.

As the information processing apparatus 10 shown in FIG. 2, a computer or a workstation can be used. The information processing apparatus 10 mainly includes an input/output interface 12, a storage unit 16, the operation unit 18, a central processing unit (CPU) 20, a random access memory (RAM) 22, a read only memory (ROM) 24, and a display control unit 26. The display device 30 that constitutes a display is connected to the information processing apparatus 10. Under a command of the CPU 20, the display device 30 displays various types of information through control of the display control unit 26.

The input/output interface 12 can input various data (information) into the information processing apparatus 10. For example, data stored in the storage unit 16 is input via the input/output interface 12.

The CPU (processor) 20 executes various types of processing of the information processing apparatus 10 by reading out various programs stored in the storage unit 16, the ROM 24, or like, and loading these programs into the RAM 22 to perform calculations.

Figure 3:
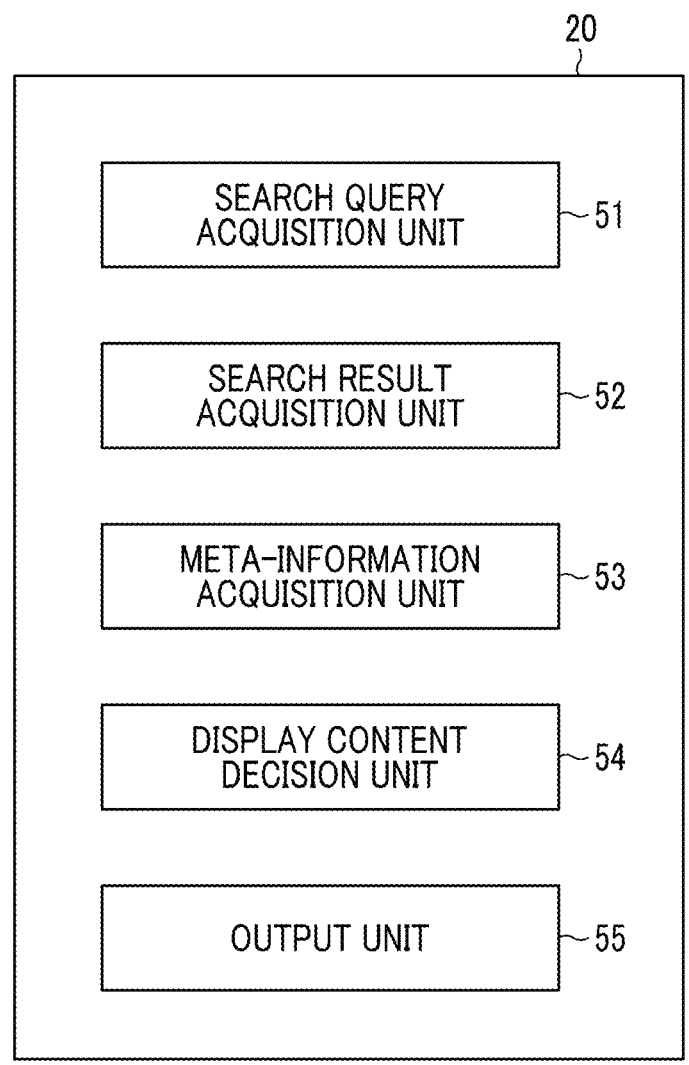
FIG. 3 is a block diagram showing processing functions realized by a CPU.

FIG. 3 is a block diagram showing processing functions realized by the CPU 20.

The CPU 20 mainly comprises a search query acquisition unit 51, a search result acquisition unit 52, a meta-information acquisition unit 53, a display content decision unit 54, and an output unit 55, and executes processing of each unit. The processing functions of the respective units will be described below.

Returning to FIG. 2, the storage unit (memory) 16 is composed of a non-transitory storage medium, such as a hard disk device and various semiconductor memories, and a control unit for the non-transitory storage medium. The storage unit 16 stores programs for operating the information processing apparatus 10, such as an operating system and a program for executing an information processing method. Further, the storage unit 16 stores information and the like used in the embodiment described below.

The operation unit 18 includes a keyboard and a mouse, and the user can cause the information processing apparatus 10 to perform necessary processing via these devices. By using a touch panel type device, the display device 30 and the operation unit 18 can be combined.

The display device 30 is, for example, a device such as a liquid crystal display and displays various types of information from the information processing apparatus 10.

Figure 4:
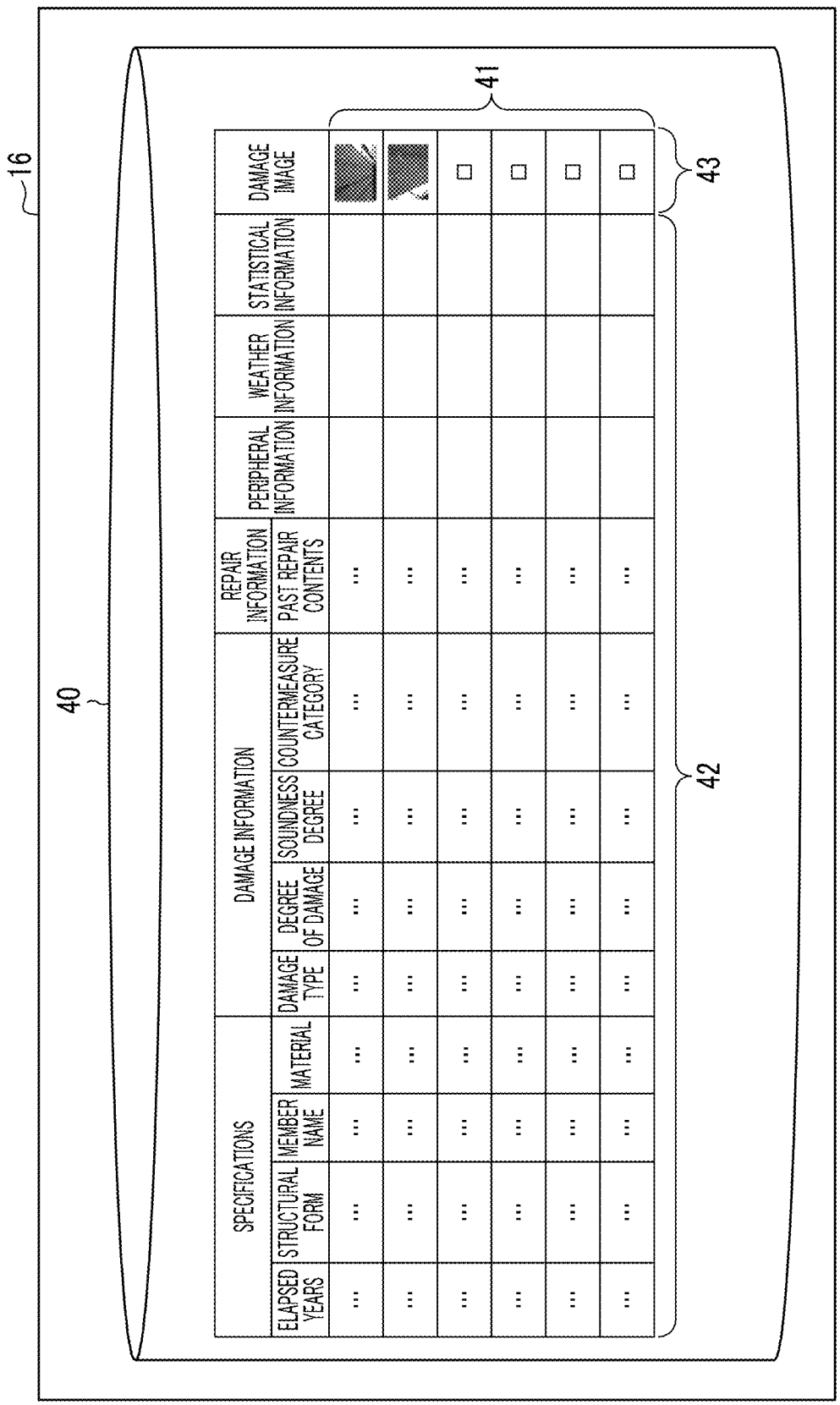
FIG. 4 is a diagram showing a database stored in the storage unit.

FIG. 4 is a diagram for describing the database 40 stored in the storage unit 16. In the embodiment, the database 40 includes inspection data 41 which is an inspection result of the structure obtained from past inspections.

As shown in FIG. 4, the inspection data 41 includes information on the structure, for example, at least one selected from the group of "specifications", "damage information", "repair information", "peripheral information", "weather information", "statistical information", and "damage image". The "specifications", the "damage information", the "repair information", the "peripheral information", the "weather information", and the "statistical information" are text data 42, and the "damage image" is image data 43. In addition, the inspection data 41 may further include text data such as "inspection date and time", "imaging date and time", and "repair date and time".

The "specifications" include at least one of elapsed years, a structural form, a member name, or a material.

Examples of the elapsed years include the number of years elapsed from a completion date or an opening date.

Examples of the structural form include a girder bridge, a rigid-frame bridge, a truss bridge, an arch bridge, a cable-stayed bridge, or a suspension bridge in a case of a bridge.

Examples of the member name include a slab, a pier, an abutment, or a girder in a case of a bridge.

Examples of the material include steel, reinforced concrete, or prestressed concrete (PC).

The "damage information" includes at least one of a damage type, a degree of damage, a soundness degree, or a countermeasure category.

Examples of the damage type include a type of damage that occurs in the structure, such as cracking (fissuring), water leakage, corrosion, breakage, or stripping.

The degree of damage is information indicating an objective state of the damage for each type of damage, and is classified according to the size, depth, and type and displayed, for example, as a to d.

Examples of an indicator of the soundness degree include an indicator showing four-level diagnosis results of I to IV, as described in inspection guidelines or the like established by the Japanese Ministry of Land, Infrastructure, Transport and Tourism.

Examples of the countermeasure category include a countermeasure category described in inspection guidelines or the like established by the Japanese Ministry of Land, Infrastructure, Transport and Tourism.

Examples of the "repair information" include, for example, past repair contents.

Examples of the "peripheral information" include a traffic volume (per day, per month, per year, cumulative, etc.) or a location (distance from the sea).

Examples of the "weather information" include an average temperature, an average humidity, a rainfall, and a snowfall.

Examples of the "statistical information" include a proportion by the type of damage or by the size of damage.

FIG. 4 illustrates a case where the database 40 is stored in the storage unit 16. However, as long as the information processing apparatus 10 can access the database 40 via a wired or wireless network, the database 40 may be stored in an external storage device.

<Information Processing Method>

Figure 5:
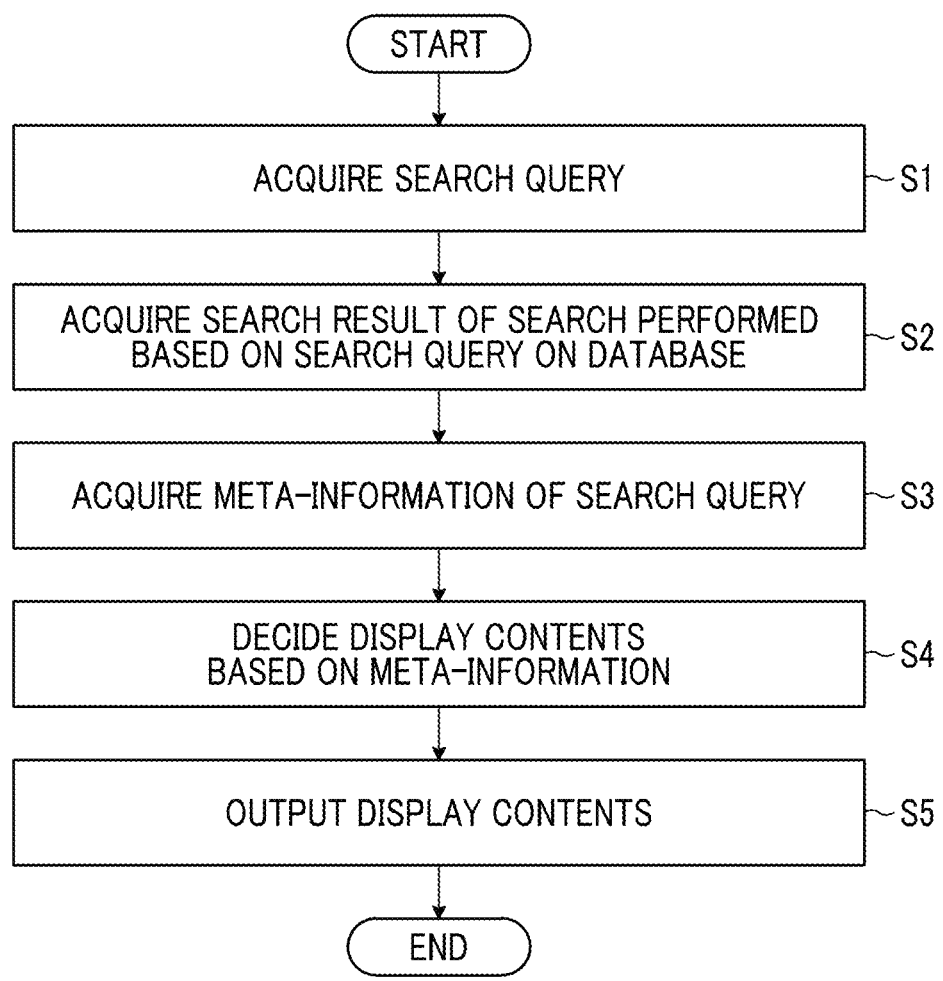
FIG. 5 is a flowchart showing an information processing method.

FIG. 5 is a flowchart showing an information processing method using the information processing apparatus 10. As shown in FIG. 5, the information processing method comprises, as an example, a step of acquiring a search query (step S1), a step of acquiring a search result (step S2), a step of acquiring meta-information of the search query (step S3), a step of deciding display contents based on the meta-information (step S4), and a step outputting the display contents (step S5).

<Step of Acquiring Search Query>

In the step of acquiring the search query (step S1), the search query acquisition unit 51 acquires the search query. The user inputs the search query into the information processing apparatus 10 via the operation unit 18, for example. In this case, the search query is created by the user based on the inspection result of the structure 1. Then, the search query acquisition unit 51 acquires the search query. In addition, as another method, the user may create the search query by using the mobile terminal 5. Further, as still another method, the search query may be automatically created from the inspection result. Here, the search query includes information for specifying a search target and is a type of processing request to the information processing apparatus 10.

The search query can include, for example, text data and/or image data. In a case where the structure 1 is the target, the search query includes at least one selected from the group of "specifications", "damage information", "repair information", "peripheral information", "weather information", "statistical information", and "damage image". The "specifications", the "damage information", the "repair information", the "peripheral information", the "weather information", and the "statistical information" are examples of the text data, and the "damage image" is an example of the image data. The search query is not limited to the above-described text data and/or image data.

It is preferable that the image data and the text data included in the search query are of the same type as the image data 43 and the text data 42 included in the inspection data 41.

Figure 6:
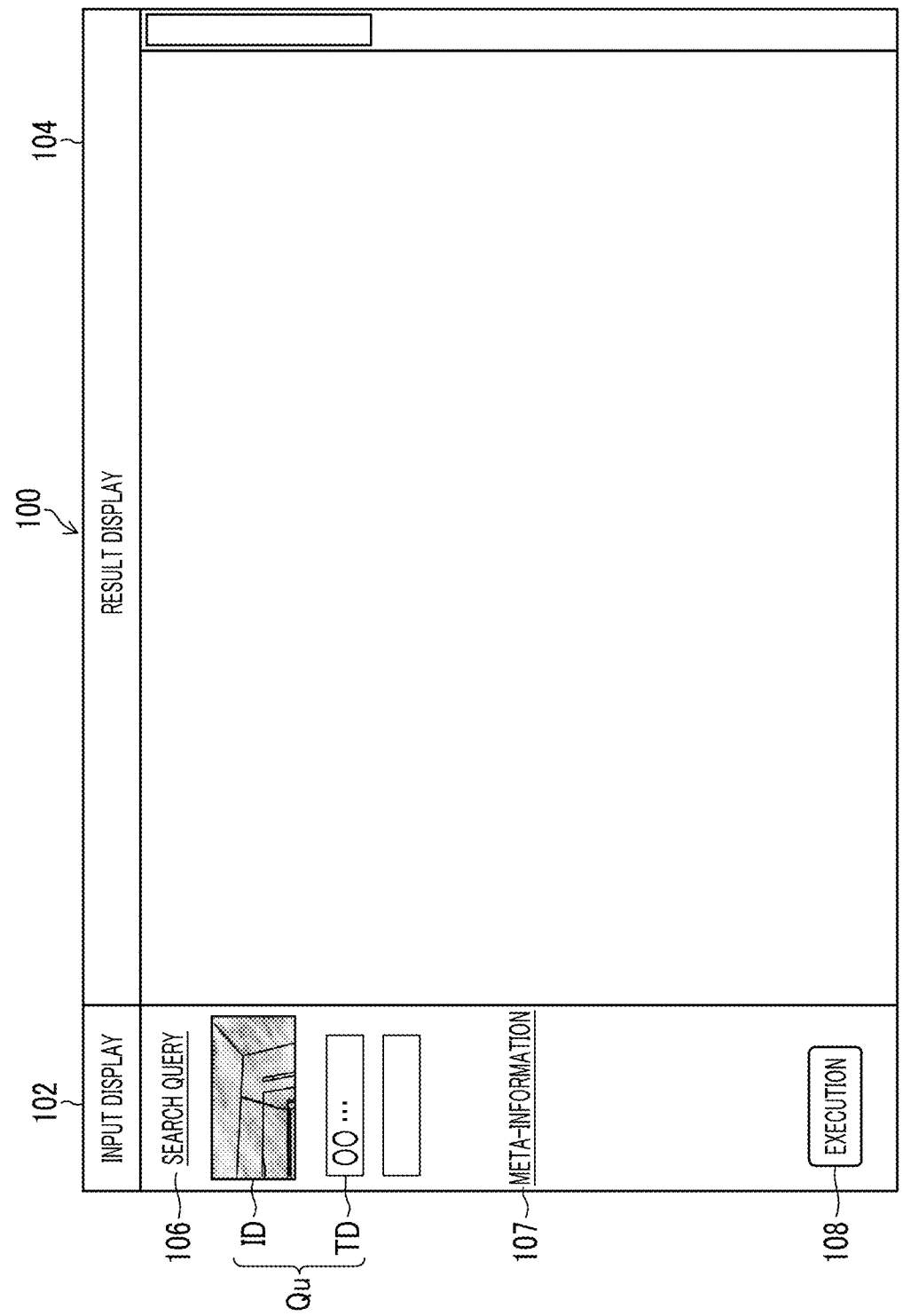
FIG. 6 is a diagram for describing an example of a display screen on which a search query is displayed.

FIG. 6 shows an example of a display screen on which the search query is displayed. A display screen 100 shown in FIG. 6 is displayed on the display device 30 under the control of the display control unit 26. The display screen 100 includes an input display screen 102 and a result display screen 104.

The input display screen 102 displays a search query Qu acquired by the search query acquisition unit 51 and displays characters "search query" in a type area 106. In a case where the search query Qu includes image data, image data ID is displayed on the input display screen 102, and the user can confirm the image data ID. In a case where the search query Qu includes text data, text data TD is displayed on the input display screen 102, and the user can confirm the text data TD. The user can input the search query Qu (image data ID and/or text data TD) from the input display screen 102, and the input search query Qu is acquired by the search query acquisition unit 51.

The input display screen 102 shown in FIG. 6 can display or input meta-information which will be described below. In an area where the meta-information is displayed or input, characters "meta-information" are displayed in a type area 107.

The input display screen 102 includes an execution button 108. In a case where the execution button 108 is operated, the process proceeds to a next step. In FIG. 6, a processing flow proceeds to step S2 of acquiring the search result.

<Step of Acquiring Search Result>

Figure 7:
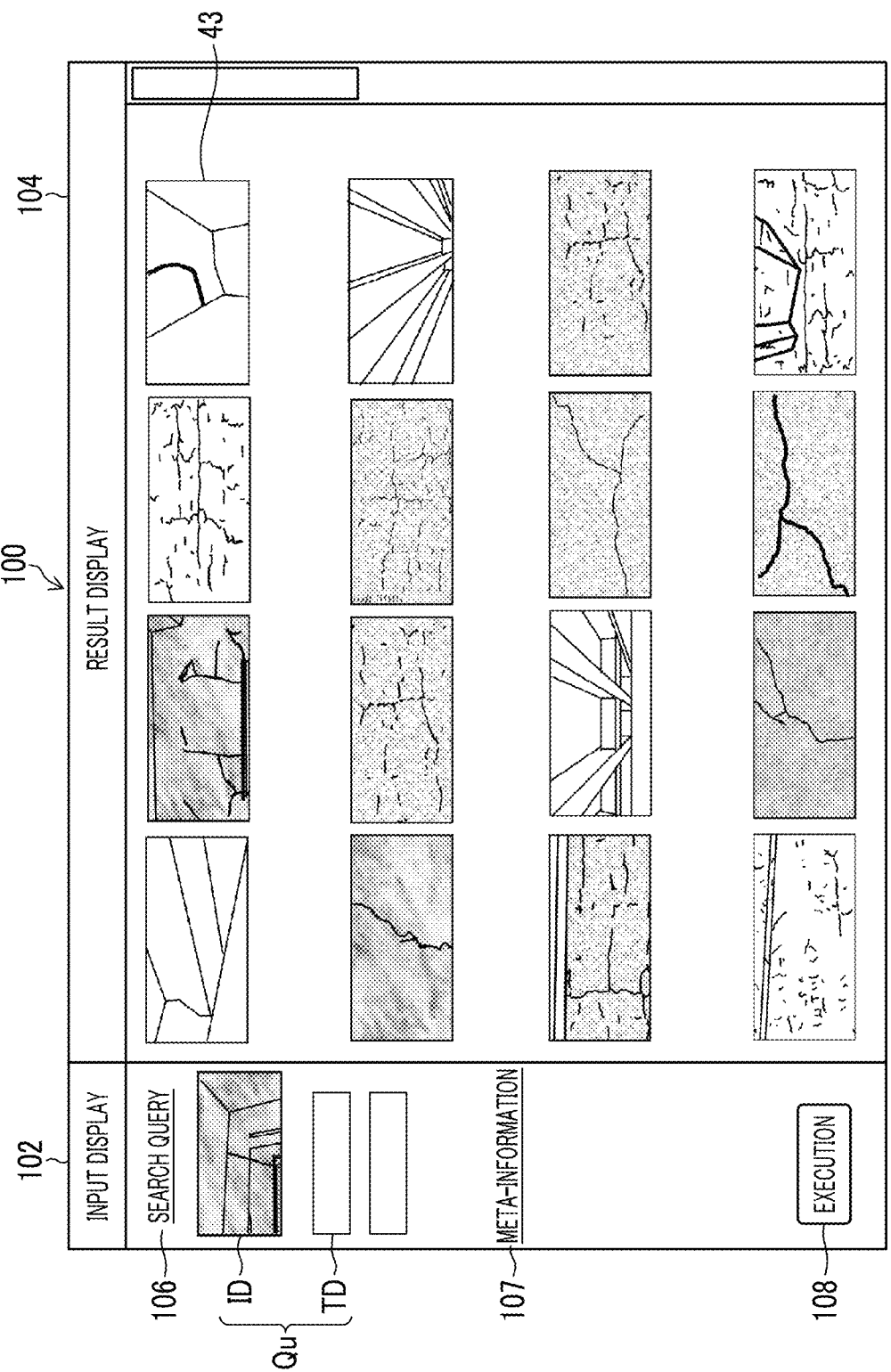
FIG. 7 is a diagram for describing an example of a display screen on which a search result is displayed.

In the step of acquiring the search result (step S2), the search result acquisition unit 52 acquires the search result of search performed based on the search query Qu on the database 40. As shown in FIG. 7, for example, the search result acquisition unit 52 acquires the inspection data 41 of inspection performed based on the search query Qu on the database 40. The acquired inspection data 41 is an example of the search result. In FIG. 7, for the sake of description, the search query Qu including only the image data ID is displayed. As described above, the search query Qu need only include at least one of the text data TD or the image data ID (not shown).

In a case where the search query Qu includes the image data ID, the search result acquisition unit 52 acquires the image data 43 from the database 40 based on the image data ID. The search result acquisition unit 52 calculates feature amounts of the image data ID and the image data 43 using an image recognition algorithm, a machine learning model, or the like. Next, the search result acquisition unit 52 compares the feature amount of the image data ID with the feature amount of the image data 43 and acquires the image data 43 corresponding to the image data ID as the search result of search performed based on the search query Qu.

In a case where the search query Qu includes the text data TD, the search result acquisition unit 52 acquires the text data 42 from the database 40 based on the text data TD. The search result acquisition unit 52 compares the text data TD with the text data 42 using a text search algorithm, a machine learning model, or the like and acquires the text data 42 corresponding to the text data TD of the search query Qu as the search result of search performed based on the search query Qu.

In addition, processing performed based on the search query referred to in the present specification means that some processing is performed on the database 40 by using information on the search query, and includes, for example, a search. The search includes concepts such as "match", "similarity", "dissimilarity", and "evaluation" (for example, "ascending order" or "descending order").

As shown in FIG. 7, the search result obtained by the search result acquisition unit 52 is displayed on the result display screen 104 under the control of the display control unit 26.

In a case where the search query Qu is the text data TD, the text data 42 corresponding to the text data TD is displayed on the result display screen 104.

FIG. 7 shows only the image data ID as the search query Qu. In addition, only the image data 43 is displayed as the search result of search performed based on the search query Qu including only the image data ID. As described above, the search query Qu need only include at least one of the image data ID or the text data TD. In addition, the search result acquisition unit 52 may acquire the search result of search performed based on the search query that combines the image data ID and the text data TD.

For example, a technique described in WO2020/071216A, WO2020/255227A, JP2018-165926A, or JP2017-167987A may be applied to the acquisition of the search result.

Next, the processing flow proceeds to step S3 of acquiring the meta-information of the search query Qu.

<Step of Acquiring Meta-Information of Search Query>

Figure 8:
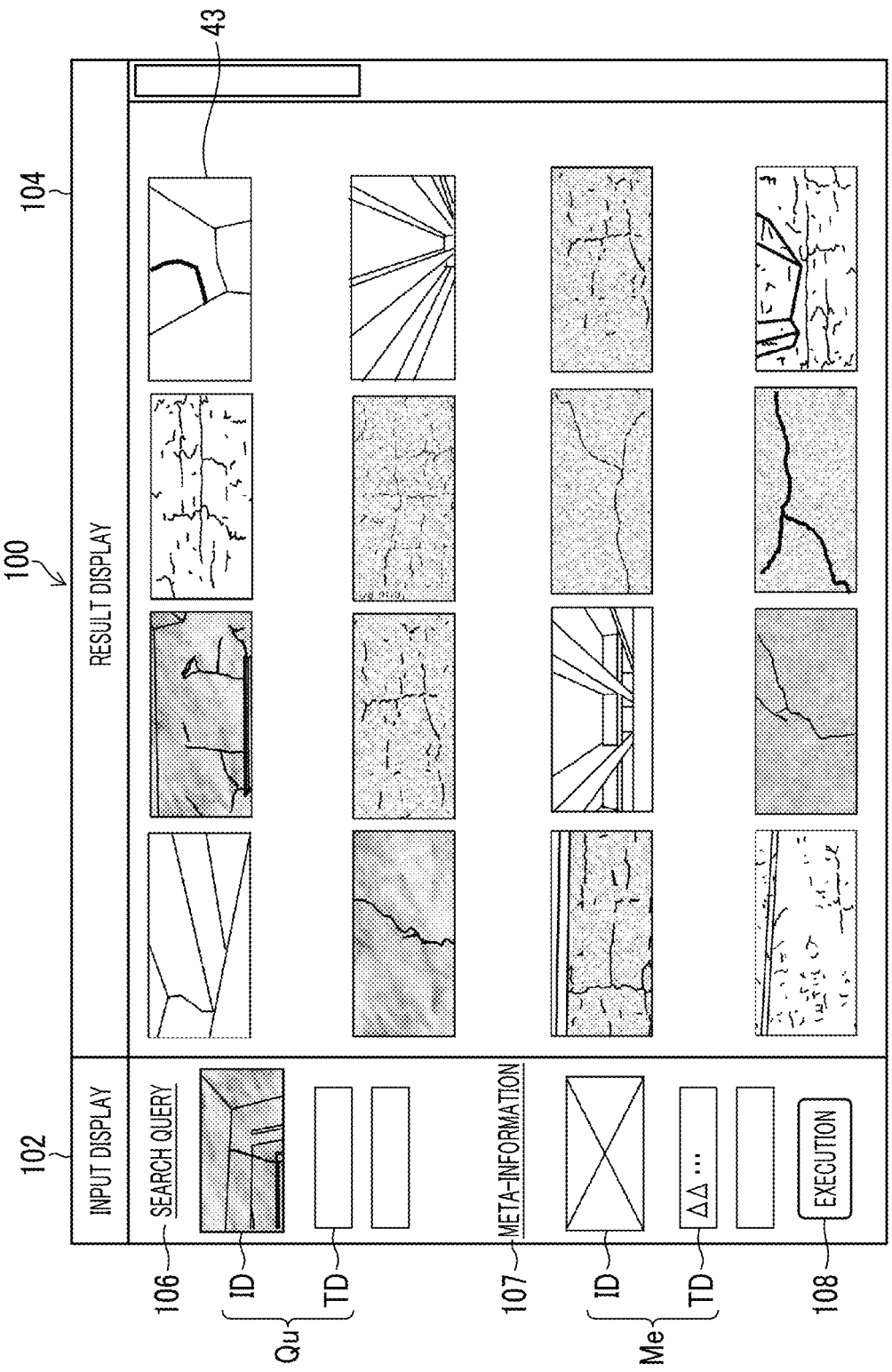
FIG. 8 is a diagram for describing an example of a display screen on which meta-information is displayed.

In the step of acquiring the meta-information of the search query Qu (step S3), the meta-information acquisition unit 53 acquires the meta-information of the search query Qu. FIG. 8 shows an example of the display screen 100 on which meta-information Me is displayed, and the acquired meta-information Me is displayed on the input display screen 102. In FIG. 8, the meta-information Me including only the text data TD is displayed. In addition, in FIG. 8, the search result acquired in step S2 is displayed on the result display screen 104.

Similarly to the search query Qu, the meta-information Me can include the text data TD and/or the image data ID and includes, for example, at least one selected from the group of "specifications", "damage information", "repair information", "peripheral information", "weather information", "statistical information", and "damage image". The "specifications", the "damage information", the "repair information", the "peripheral information", the "weather information", and the "statistical information" are examples of the text data TD, and the "damage image" is an example of the image data ID. The search query Qu and the meta-information Me can include the same type of the image data ID and the text data TD. Note that the information included in the meta-information Me is not limited to these. In FIG. 8, the meta-information Me including only the text data TD (image data ID is not shown) is displayed. The meta-information Me need only include either the text data TD or the image data ID.

Here, the meta-information Me is not the search query Qu itself but information that is related to the search query Qu.

Next, combinations of the search query Qu and the meta-information Me will be shown. Table 1 shows an example of the combinations of the search query Qu and the meta-information Me. In a case where the target is a structure, the following combinations can be exemplified. No. 1 shows that the search query Qu is the image data (damage image) and the meta-information Me is the text data (specifications, damage information, repair information, statistical information, and the like). No. 2 shows that the search query Qu is the text data (specifications, damage information, repair information, statistical information, and the like) and the meta-information Me is the image data (damage image). No. 3 shows that the search query Qu is the image data (damage image) and the meta-information Me is the image data (damage image). In No. 3, in a case where the search query Qu and the meta-information Me each include a damage image as the image data, the damage image different from the search query Qu is applied as the damage image of the meta-information Me. As the damage image of the meta-information Me, an image completely different from the search query Qu, a past image, a slightly processed image, or an image captured from a remote place can be exemplified.

Table 1 is an example of the combinations of the search query Qu and the meta-information Me, but the combinations are not limited thereto.

TABLE 1

| No | Search query Qu | Meta-information Me |
|---|---|---|
| 1 | Image data<br>Damage image | Text data<br>Specifications, Damage information, Repair information, Statistical information, etc. |
| 2 | Text data<br>Specifications, Damage information, Repair information, Statistical information, etc. | Image data<br>Damage image |
| 3 | Image data<br>Damage image | Image data<br>Damage image different from search query (Example: Completely different image, Past image, Slightly processed image) |

The meta-information acquisition unit 53 can automatically acquire the meta-information Me of the search query Qu. For example, in a case where the search query Qu is the image data, an exchangeable image file format (Exif) is automatically acquired as the meta-information Me by the meta-information acquisition unit 53. The Exif is information attached to the image data during imaging and includes information such as circumstances and settings during imaging. Further, in a case where the image data of the search query Qu is captured in a GPS reception environment, the meta-information Me may include positional information, latitude and longitude, or altitude.

In addition, in a case where the image data of the search query Qu is a "damage image", the meta-information Me can be acquired by using a machine-learned learning model.

For example, the "damage information" can be specified by the learning model based on the "damage image" of the search query Qu. The specified "damage information" is acquired as the meta-information Me by the meta-information acquisition unit 53.

The meta-information Me can be manually input into the information processing apparatus 10 by the user. FIG. 8 is an example of a display screen showing an input example of the meta-information Me. The display screen 100 of FIG. 8 can execute the confirmation of the acquired meta-information Me and the input of the meta-information Me. That is, the user can manually input the image data ID and/or the text data TD as the meta-information Me onto the input display screen 102 of the display screen 100. The input meta-information Me is acquired by the meta-information acquisition unit 53. FIG. 8 shows a case where the meta-information Me is the text data TD, and the text data TD is displayed as the meta-information Me. Not only the text data TD but also the image data ID can be input as the meta-information Me. In that case, the image data ID is displayed on the input display screen 102.

In a case where the user manually inputs the meta-information Me, the user associates the search query Qu and the meta-information Me with each other. For example, in a case where the meta-information Me is input, the user displays the search query Qu on the input display screen 102 and performs processing to associate the meta-information Me with the search query Qu, so that the search query Qu and the meta-information Me are associated. The user can optionally associate the search query Qu with the meta-information Me.

Even in a case where the meta-information Me is automatically acquired, the input display screen 102 can display the meta-information Me under the control of the display control unit 26, and the user can confirm the meta-information Me.

In a case where the execution button 108 of the input display screen 102 is operated, the processing flow proceeds to step S4 of deciding the display contents based on the meta-information. Further, the processing flow can proceed to step S5 of outputting the display contents after step S4.

<Step of Deciding Display Content>

In the step of deciding the display contents (step S4), the display content decision unit 54 decides the display contents for the search result based on the meta-information Me. Here, the decision on the display contents is a concept that includes a decision on a display target and a decision on a display method. For example, the decision on the display contents includes emphasis or suppression of the display contents, order change, display of statistical information such as average and variance, and the like. Examples of the decision on the display contents include displaying a damage image (thumbnail or enlarged image), a damaged location, meta-information such as specifications, and statistical information such as a proportion (for example, among top 100 damage types, fissuring is 80%, and stripping or exposed rebar is 20%), a user interface (UI) switching button (for example, a list display or an enlarged display), and additional operation guidance (for example, a highlighted display or a grayed-out display).

Next, the decision on the display contents by the display content decision unit 54 will be illustrated and described. A case will be described where the search query includes the image data ID and the search result of search performed based on the search query is acquired in step S2. The search result is acquired from the database 40, and the search result can include the image data 43 and the text data 42.

This is a case where the meta-information Me includes the text data TD such as "specifications", "damage information", "repair information", or "statistical information". The display content decision unit 54 can decide the search result having the same text data 42 as the text data TD of the meta-information Me as the display contents. The decision on the display contents is a decision on a target of the display contents and is an example of a decision on adoption or rejection of a candidate for the display contents.

Next, a case will be described where the meta-information Me includes the degree of damage. The display content decision unit 54 can decide to display the statistical information (proportion of the degree of damage) included in the search result as information related to the meta-information. That is, the statistical information included in the text data 42 is a target to be displayed in addition to the search result (image data 43). In order to add other display contents, the display content decision unit 54 can decide to hide the already displayed display contents. The decision on the display content is an example of deciding display contents to be hidden and other display contents to be displayed.

Next, a case where the meta-information Me includes a damage type (fissuring, free lime, or the like) or a degree of damage (size, depth, or the like) will be described. The display content decision unit 54 can decide to enlarge, reduce, zoom in, or zoom out the image data 43 in consideration of the damage type, the degree of damage, and an imaging range of the image data 43 of the search result. The decision on the display contents is an example of a decision on the display contents based on the search result.

Next, a case where the meta-information Me includes the image data ID will be described. The display content decision unit 54 can decide, based on a degree of association between the image data ID and the image data 43, the display contents of the search result in descending order of the degree of association. The decision on the display contents is an example of deciding a priority of the display contents.

<Step of Outputting Display Content>

In the step of outputting the display content (step S5), the output unit 55 displays the decided display contents on the display device 30 via the display control unit 26. Although a case has been illustrated where the output unit 55 displays the display contents on the display device 30, the output unit 55 can also output the decided display contents to a printer and as electronic data in various data formats.

Next, an example of the display contents to be displayed on the display device 30 will be described below with reference to FIGS. 9 to 12.

Figure 9:
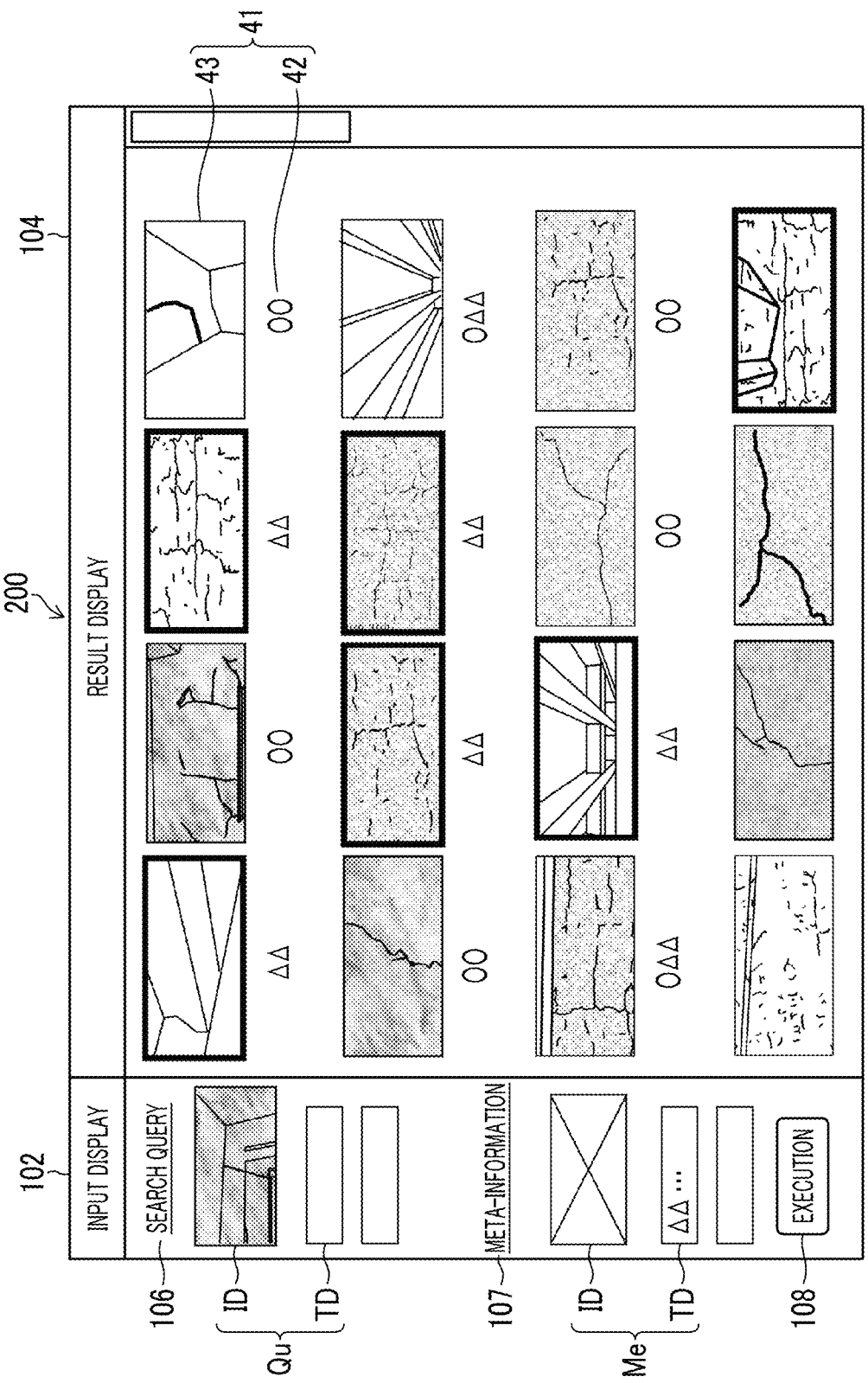
FIG. 9 is a diagram for describing an example of an emphasized display screen.

FIG. 9 shows an example of a display screen 200 displayed by the display device 30. The display screen 200 includes the display contents decided in step S4. A configuration of the display screen 200 is basically the same as that of the display screen 100 shown in FIG. 8. However, in the display screen 200, the image data 43, which includes the same text data 42 as the text data TD of the meta-information Me, is emphasized.

In the display screen 200, the text data 42 is displayed under the image data 43, and the corresponding image data 43 is surrounded by a thick frame. Since the image data 43 is surrounded by a thick frame, the user can easily recognize the corresponding image data 43. In FIG. 9, although a thick frame is used for emphasis display, the emphasis display is not limited to this and may be a change in color of the text data 42, a change in thickness of characters, blinking, or the like.

FIG. 10 shows an example of a display screen 202 displayed by the display device 30. A configuration of the display screen 202 is basically the same as that of the display screen 100 shown in FIG. 8. However, in the display screen 202, only the image data 43, which includes the same text data 42 as the text data TD of the meta-information Me, is displayed. That is, the display screen 202 of FIG. 10 is an example of a decision on the adoption or rejection of a candidate for the display contents.

FIG. 11 shows an example of a display screen 204 displayed by the display device 30. A configuration of the display screen 204 is basically the same as that of the display screen 100 shown in FIG. 8. However, in the display screen 204, the image data 43 is enlarged based on the text data TD of the meta-information Me. For example, in a case where the text data TD includes the damage type or the degree of damage, the image data 43 is enlarged, allowing the user to easily visually recognize the damage type or the degree of damage. The image data 43 may be zoomed in as necessary. Alternatively, the image data 43 may be reduced or zoomed out such that the user can easily visually recognize the image data 43. In FIG. 11, the text data TD including the damage type or the degree of damage is displayed under the image data 43. The user can easily ascertain a point to which attention should be paid in the search result.

FIG. 12 shows an example of a display screen 206 displayed by the display device 30. A configuration of the display screen 206 is basically the same as that of the display screen 100 shown in FIG. 8. However, in the display screen 206, the image data 43 is sorted in descending order of a degree of association with the image data ID of the meta-information Me. Further, only the top six image data 43 having a higher degree of association with the image data ID are displayed. The decision on the display contents is an example of deciding a priority of the display contents. The configuration of the display screen 206 is not particularly limited. For example, the image data 43 may be sorted in descending order of a degree of association, and only the top six image data 43 may be emphasized. The user can easily determine the search result of search performed based on the search query.

<Others>

In the embodiments, a hardware structure of a processing unit that executes various processing is the following various processors. The various processors include a central processing unit (CPU) that is a general-purpose processor functioning as various processing units by executing software (program), a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like.

One processing unit may be configured by one of these various processors, or may be configured by two or more same type or different types of processors (for example, a plurality of FPGAs or a combination of the CPU and the FPGA). Moreover, a plurality of processing units can be configured by one processor. As an example of configuring the plurality of processing units by one processor, first, there is a form in which one processor is configured by a combination of one or more CPUs and software, as represented by a computer such as a client or a server, and the one processor functions as the plurality of processing units. Second, as represented by a system on chip (SoC) or the like, there is a form of using a processor that realizes, by one integrated circuit (IC) chip, functions of the entire system including the plurality of processing units. As described above, the various processing units are configured using one or more of the above various processors as a hardware structure.

Further, as the hardware structure of the various processors, more specifically, an electric circuit (circuitry) in which circuit elements such as semiconductor elements are combined may be used.

Each of the configurations and functions described above can be appropriately realized by using any hardware, software, or a combination of both. For example, the present invention can also be applied to a program for causing a computer to execute the above-described processing steps (processing procedures), a computer-readable storage medium (non-transitory storage medium) in which such a program is stored, or a computer on which such a program can be installed.

Although examples of the present invention have been described above, it goes without saying that the present invention is not limited to the above-described embodiment and various modifications can be made without departing from the scope of the present invention.

EXPLANATION OF REFERENCES

1: structure
3: camera
5: mobile terminal
10: information processing apparatus
12: input/output interface
16: storage unit
18: operation unit
20: CPU
22: RAM
24: ROM
26: display control unit
30: display device
40: database
41: inspection data
42: text data
43: image data
51: search query acquisition unit
52: search result acquisition unit
53: meta-information acquisition unit
54: display content decision unit
55: output unit
100: display screen
102 Input display screen
104 result display screen
106: type area
107: type area
108: execution button
200: display screen
202: display screen
204: display screen
206: display screen
ID: image data
TD: text data
Me: meta-information
Qu: search query

What is claimed is:

1. An information processing apparatus comprising a processor,
wherein the processor is configured to:
acquire a search query;

acquire a search result of search performed based on the search query on a database;

acquire meta-information of the search query, wherein the meta-information includes at least one of text data and image data; and decide display contents for the search result based on the meta-information, wherein the decision on the display contents includes a decision on a display target and a decision on a display method, and the display target and the display method are determined based on information represented in at least one of the text data and the image data included in the meta-information, wherein when the text data included in the meta-information includes damage information, the display target is the search result having damage information that matches the damage information included in the meta-information, wherein when the damage information included in the meta-information includes a degree of damage, the display target further includes statistical information representing a proportion of the degree of damage included in the search result, and the display method includes at least one of enlarging, reducing, zooming in, or zooming out the display target in consideration of the degree of damage included in the search result.

2. The information processing apparatus according to claim 1,
wherein the processor is configured to output the display contents.

3. The information processing apparatus according to claim 1,
wherein the processor is configured to decide a priority of the display contents.

4. The information processing apparatus according to claim 1,
wherein the processor is configured to decide adoption or rejection of a candidate for the display contents.

5. The information processing apparatus according to claim 1,
wherein the processor is configured to decide the display contents to be hidden and other display contents to be displayed.

6. The information processing apparatus according to claim 1,
wherein the meta-information includes information about a structure.

7. The information processing apparatus according to claim 6,
wherein the information about the structure in the meta-information includes at least one selected from the group of a damage image, specifications, the damage information, repair information, peripheral information, weather information, and statistical information.

8. The information processing apparatus according to claim 1,
wherein the search query includes information about a structure.

9. The information processing apparatus according to claim 8,
wherein the information about the structure in the search query includes at least one selected from the group of a damage image, specifications, the damage information, repair information, peripheral information, weather information, and the statistical information.

10. The information processing apparatus according to claim 1, wherein a combination of the search query and the meta-information is one of the following:
in a case where the search query is a damage image, the meta-information is at least one of the text data selected from specifications, the damage information, repair information, peripheral information, weather information, and statistical information,
in a case where the search query is at least one of the text data selected from specifications, the damage information, repair information, peripheral information, weather information, and the statistical information, the meta-information is a damage image, or
in a case where the search query is a damage image, the meta-information is a damage image different from the damage image specified in the search query.

11. An information processing method executed by a processor, the method comprising:
acquiring a search query;
acquiring a search result of search performed based on the search query on a database;
acquiring meta-information of the search query, wherein the meta-information includes at least one of text data and image data; and
deciding display contents for the search result based on the meta-information, wherein the decision on the display contents includes a decision on a display target and a decision on a display method, and the display target and the display method are determined based on information represented in at least one of the text data and the image data included in the meta-information,
wherein when the text data included in the meta-information includes damage information, the display target is the search result having damage information that matches the damage information included in the meta-information,
wherein when the damage information included in the meta-information includes a degree of damage, the display target further includes statistical information representing a proportion of the degree of damage included in the search result, and the display method includes at least one of enlarging, reducing, zooming in, or zooming out the display target in consideration of the degree of damage included in the search result.

12. A non-transitory, computer-readable tangible recording medium on which a program for causing, when read by a computer, a processor of the computer to execute the information processing method according to claim 11 is recorded.

* * * * *